Aug. 11, 1964  H. D. BROWN  3,144,135
COMBINATION DERRICK AND PORTABLE DIGGER SUPPORT FOR TRUCKS
Filed May 7, 1962  2 Sheets-Sheet 1
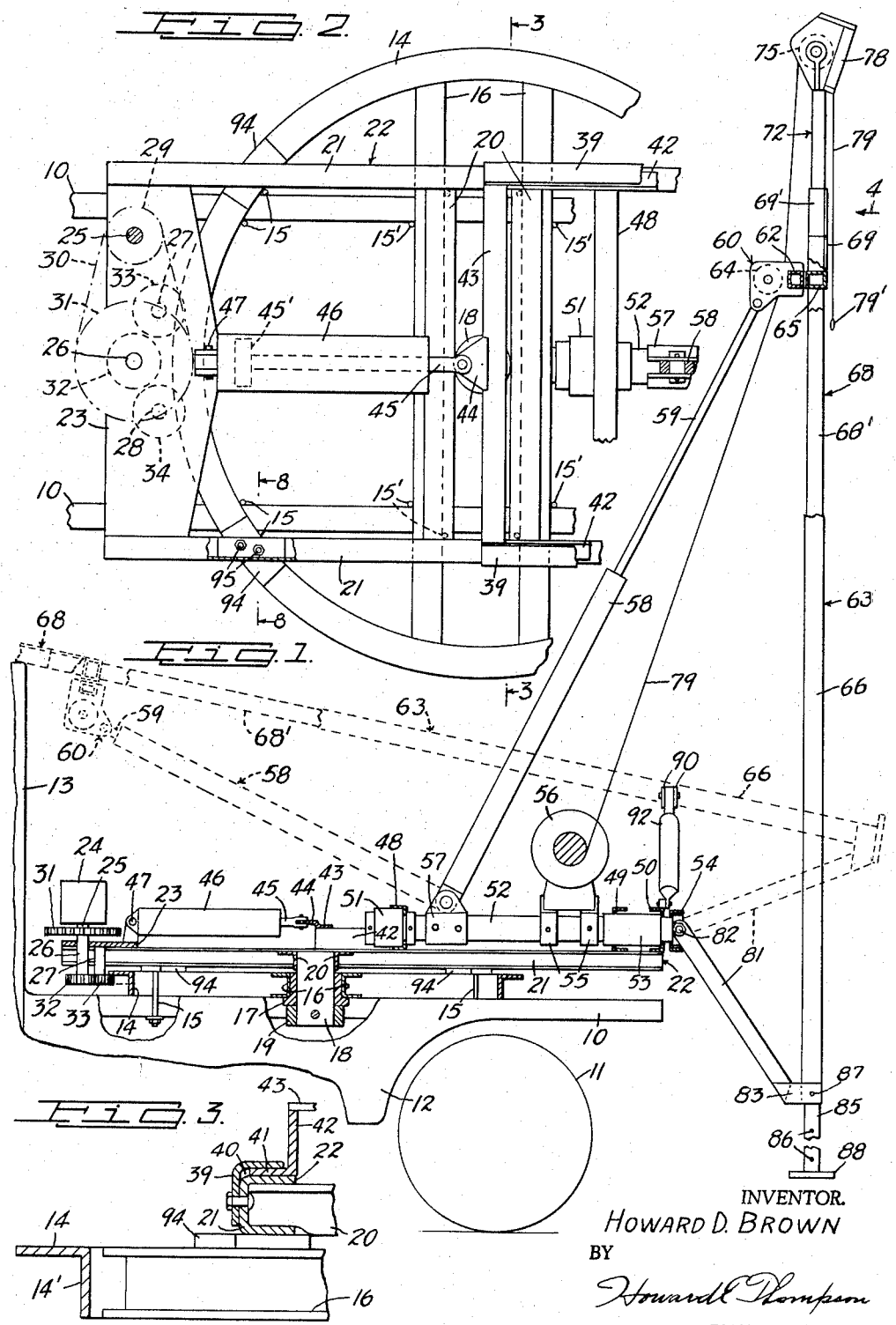
INVENTOR.
HOWARD D. BROWN
BY
Howard E. Thompson
ATTORNEY

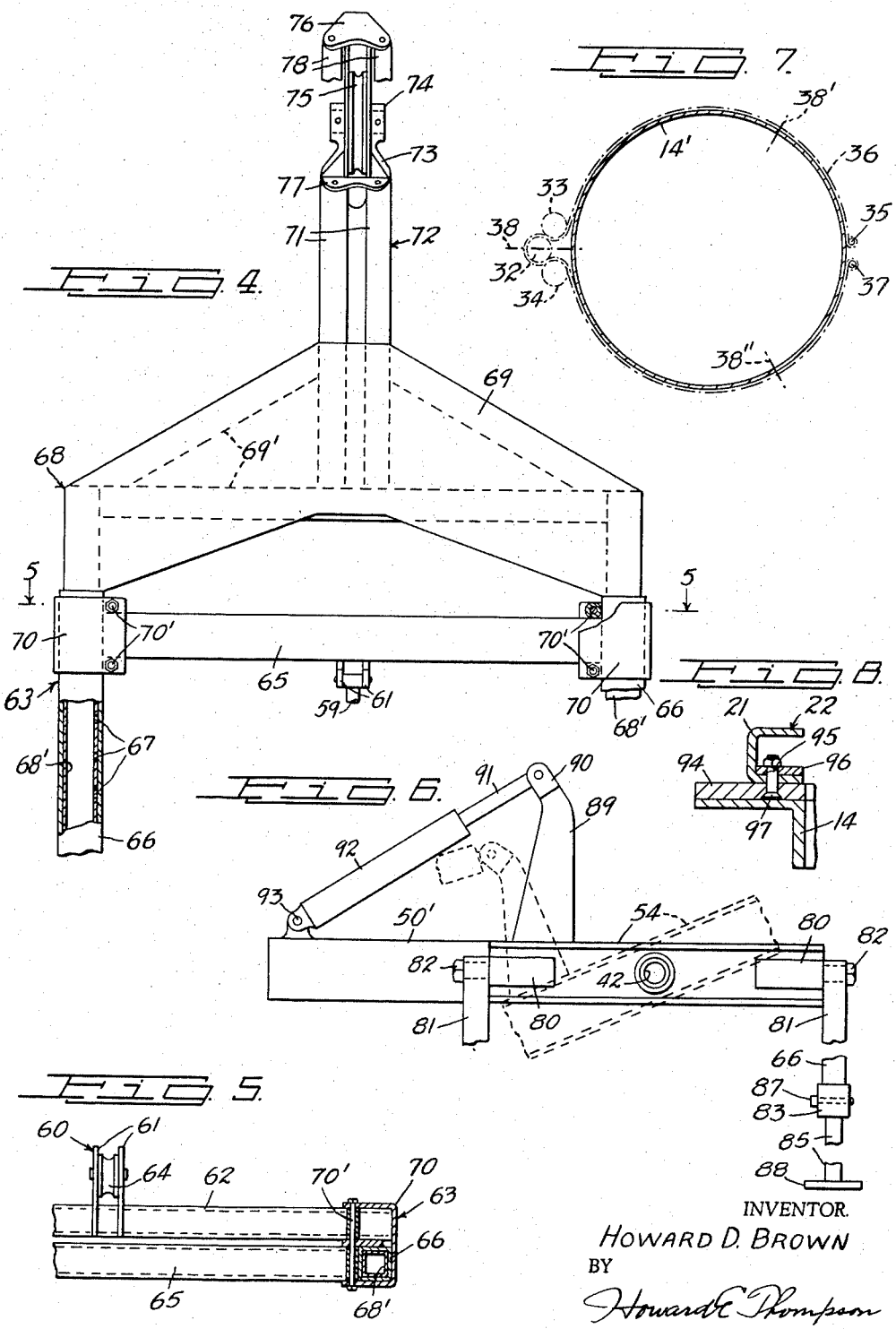

United States Patent Office 3,144,135
Patented Aug. 11, 1964

3,144,135
COMBINATION DERRICK AND PORTABLE
DIGGER SUPPORT FOR TRUCKS
Howard D. Brown, Star Rte., Atlantic, Iowa
Filed May 7, 1962, Ser. No. 192,821
12 Claims. (Cl. 212—35)

This invention relates to derricks such as commonly employed on trucks and, particularly, derricks for use in the handling and setting of poles, wherein the derrick employs a frame, in conjunction with which a digger supporting frame is adjustably mounted and, wherein, the entire derrick and digger structure is adjustably supported on the truck chassis to be extended, tilted and swung through an arc greater than 200°. More particularly, the invention deals with a structure of the character described, wherein the combined derrick digger structure is mounted on a frame slidably supported in support means on the truck chassis and actuated by a hydraulic cylinder and, wherein, the support means for this frame is preferably swingably mounted on the chassis structure and, still further, wherein the derrick, including the digger supporting frame and the digger when mounted therein, is entirely collapsible upon the truck in transporting the truck from place to place.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side and sectional view of the rear portion of a truck showing the derrick structure and digger supporting frame in extended use position in full lines and in collapsed position upon the truck in dotted lines, parts of the construction being broken away and in section and parts shown in elevation.

FIG. 2 is a slightly enlarged diagrammatic plan view of the inner end portion of the frame structures of my derrick digger, diagrammatically showing part of the drive in dot-dash lines and parts of the construction being broken away and in section and, further, omitting the body structure of the vehicle.

FIG. 3 is an enlarged partial section on the line 3—3 of FIG. 2.

FIG. 4 is an enlarged view looking generally in the direction of the arrow 4 of FIG. 1, showing the upper derrick frame and part of the upper end of the digger supporting frame, with parts of the construction broken away and omitting showing of the cable.

FIG. 5 is a partial section on the line 5—5 of FIG. 4.

FIG. 6 is an enlarged view looking generally in the direction of the arrow 4 of FIG. 1, showing the tiltable frame of the derrick and indicating, in part, in dotted lines one of the tilted positions of said tiltable frame.

FIG. 7 is a diagrammatic sectional view through part of a support ring, illustrating the feed chain construction and drive therefor for actuation of the swinging frame of the derrick; and FIG. 8 is an enlarged partial sectional view on the line 8—8 of FIG. 2.

In the accompanying drawings, I have illustrated one adaptation and use of my invention and, in this use, means is disclosed for providing a rotatable or swinging mount of the combination derrick digger on the truck body. However, in some instances, the swinging characteristics can be dispensed with and the structure mounted directly upon the chassis of a truck body, this latter arrangement being a more specified use of the invention. In the accompanying drawings, the various parts are more or less diagrammatically illustrated, simply to convey the general arrangement of the combined structure and its mounting and, unless otherwise specified, all expressions of being secured to or mounted on and the like will be understood to mean that the parts are welded or bolted together. Thus later detailed reference to these weldings as attachments will be dispensed with and, accordingly, the specification simplified.

In FIG. 1 of the drawing, I have shown at 10 part of the chassis of a vehicle supporting my combination derrick digger. 11 outlines one of the rear wheels. At 12 is shown part of the body structure at sides of the vehicle and 13 indicates the general position of the rear portion of the front body structure or cab. The chassis 10 consists primarily of two rearwardly extending side frames, these two frames being illustrated, in part, in FIG. 2 of the drawing. Supported upon these frames is an annular support ring 14 of L-shaped cross-sectional form, as clearly noted in FIGS. 1 and 2 of the drawing, and this frame is securely clamped to the chassis by bolts 15 welded to the inner surfaces of the ring and one of these bolts 15 is indicated in somewhat detailed form at the left of FIG. 1 and location of these bolts is further illustrated in FIG. 2. Secured to the ring 14 at spaced intervals centrally thereof are a pair of channel-iron rails 16, supporting centrally of the ring a bushing 17 for a pivot axis 18, note FIG. 1, a retaining collar 19 being pinned to the lower end of the axis 18. Secured to the upper end of the axis 18 are another pair of angleiron rails 20, the latter rails being also secured to channel side rails 21 in forming part of the swinging frame 22 of the apparatus. Considering FIG. 2 of the drawing, it will appear that other bolts 15′, similar to the bolts 15, are employed in further bracing the support of the support ring 14 upon the chassis sides 10.

Secured to and bracing the inner end of the rails 21 is a relatively wide crossplate 23, note FIG. 2, which forms a support for a hydraulic motor 24 and its shaft, shown, in section, at 25 in FIG. 2 of the drawing. The plate 23 also forms a suitable support for shafts 26, 27 and 28. On the shaft 25 is fixed a sprocket, diagrammatically shown at 29 in dot-dash lines of FIG. 2, around which passes a chain, shown in dot-dash lines at 30, which passes around a sprocket 31, also illustrated in dot-dash lines in FIG. 2 and diagrammatically illustrated in FIG. 1, the sprocket 31 being fixed to the shaft 26. Also fixed to this shaft is another swinging frame drive sprocket 32. On the shafts 27 and 28 are other idler sprockets 33 and 34, part of the sprocket 33 being illustrated in FIG. 1.

Turning now to the diagrammatic illustration of FIG. 7, here is shown, in section, the depending wall 14′ of the support ring 14. Fixed at 35 is one end of a chain, indicated in dot-dash lines at 36 in FIG. 7 which passes around the wall 14′, then around the idler sprocket 33, then around the drive sprocket 32 and then around the other idler sprocket 34 and back to another point of attachment 37 adjacent 35 and this latter attachment can be suitably adjusted in order to maintain tensional engagement on the chain at all times. In the diagrammatic showing of FIG. 7, the dot-dash line 38 represents the axis of 32 in the position shown and this axis can be moved around to assume axis lines 38′ or 38″ or at least reasonably close to these axes, the swinging frame 22 being capable of swinging through an arc of at least 200°. It will be apparent that, as the drive sprocket 32 is driven in either one of two directions, this sprocket will move either in the direction of 38′ or 38″ and correspondingly swing the entire frame 22. Suitable controls will be provided for governing direction of travel and location of the frame in bringing the derrick, later described, in a desired position at the back or along either side of the chassis of the vehicle.

Also secured to the rails 21 of the swinging frame 22 are side angleirons 39, shown, in part, in FIG. 2 and, in section, in FIG. 3, these angle irons being so attached as to form slide channels, as clearly noted at 40 in FIG. 3, in which horizontal portions 41 of angle rails 42 of the derrick and digger base are slidably mounted. Fixed to the inner end of the rails 42 is a cross-strap 43 having centrally an offset rearwardly extending pivot portion 44, with which the plunger rod 45 of a slide operating hydraulic cylinder 46 is pivotally coupled, the cylinder 46 having a pivotal mounting in connection with the plate 23, as seen at 47. In FIG. 2 of the drawing, the piston actuating the rod 45 is indicated in dotted lines at 45'. No attempt is made to show the feeds to and from the cylinder, as structures of this type and kind are well known in the art.

Fixed to the inner portion of the rails 42 is a channel crossrail 48 and also fixed to this rail are other channel cross-straps 49 and 50, the latter being normally positioned at the rear portion of the truck, as diagrammatically seen in FIG. 1 of the drawing. Arranged in the rail 48 is a suitable bearing 51 for a pivot tube 52, which also has bearing supports, as at 53 in the rails 49 and 50. Fixed to the rear protruding end of the tube 52 is a channelled tilt frame 54. Fixed to the tube 52, adjacent the bearing 53, are a pair of brackets 55 for suitable support of a winch 56, which is diagrammatically shown. Also fixed to the tube 52, adjacent the bearing 51 is a pivot bracket 57 forming the pivotal support for the lower end of a long hydraulic cylinder 58, constituting part of the derrick structure. The plunger 59 of the cylinder 58 is pivoted to a pulley coupling 60. The coupling 60 comprises a pair of spaced plates 61 fixed to a reinforcing tube 62, constituting part of the upper crossbar of the lower digger supporting frame, generally identified by the reference character 63. A pulley 64 is pivotally supported between the plates 61, as clearly illustrated in FIG. 5 of the drawing. The upper end of the digger frame 63 includes a crossbar or tube 65 fixed to the upper ends of depending square columns 66, note FIGS. 4 and 5. The digger supporting frame 63 forms the support for a portable hydraulically operated digger of the type and kind disclosed in my Letters Patent Number 2,776,114, issued Jan. 1, 1957, and, as the digger itself forms no part of the present invention, no detailed showing whatever of the digger will be herein made, it being understood, however, that the digger will constitute a part of the combination and will be moved with the derrick both in the several operative positions thereof, as well as in the collapsed position, as indicated in dotted lines in FIG. 1 of the drawing. Adjustable in the columns 66 through the medium of longitudinally spaced apertures 67 are the side depending tubes or columns 68' of the upper derrick frame 68.

In FIG. 1 of the drawing, the derrick frame 68 is shown in a collapsed position, that is to say, with the derrick frame lowered with respect to the digger frame 63. The crosshead of the derrick frame 68 includes a side plate 69, generally of the contour shown in FIG. 4. Sides of the plate 69 are fixed to the columns 68'. Considering FIG. 5, it will appear that angle iron portions 70, one only of which is shown in section at the right of said figure, are fixed to ends of the reinforcing tube 62 and the crossbar 65 of the crosshead structure. The angle iron portions 70 are secured in position by bolts 70', one of which is shown clearly at the right of FIG. 5. The plate 69 includes a triangular reinforcement 69', to which is fixed upwardly extending channel rails 71 forming part of an extension 72 to the derrick frame 68. Fixed to the upper end of rails 71 is a bracket structure 73, including a bearing support 74 for a pulley 75. The bracket structure further includes a top plate 76 which, in combination with a lower flange portion 77, forms a pivotal support for a pair of rollers shown, in part, at 78 in FIG. 4 of the drawing and one of these rollers being shown completely in FIG. 1. These rollers form antifrictional guides for the cable 79, which extends from the winch 56 over the guide pulley 64 and around the pulley 75, the free end 79' of the cable being coupled with a pole or any other item in conjunction with which the derrick is used for lifting or handling purposes.

Considering FIGS. 1 and 6 of the drawing, it will appear that the tiltable frame 54 has, fixed to its ends, pivot blocks 80, to which are pivoted square tubular supports and guides 81, as seen at 82, these guides having at their lower ends offset brackets 83, note FIG. 1, which are fixed to the lower ends of the columns 66 of the digger frame 63. Suitable means, not shown, is provided on the columns 66 to engage the several apertures 67 in the tubes or columns 68' in retaining the derrick frame 68 in adjusted position in the digger frame 63. Also adjustably supported in the lower ends of the columns 66 are ground engaging tubular supports 85, having spaced apertures 86, note FIG. 1, engaged by a pin 87 in the brackets 83, so as to control positioning of feet 88 at the lower ends of the supports 85. Part of this structure is also shown at the right of FIG. 6 and at the lower part of FIG. 1. Secured to and projecting above the tiltable frame 54 is an upwardly extending arm 89, note FIG. 6, in the upper forked end 90 of which is pivoted the plunger rod 91 of a tilt control hydraulic cylinder 92, this cylinder being pivoted to a side extension 50' of the channel rail 50, as seen at 93. Here again, in dealing with the cylinder 92 and also referring back to the cylinder 58, no illustrations of the usual pipe or hose connections with the cylinders are shown, as these are well known in the art and form no part of the present invention.

In actuation of the cylinder 92, the frame 54 can be tilted in the direction illustrated in dotted lines in FIG. 6, or in the opposed direction within limits in positioning the combination derrick digger frames to adjust themselves to uneven terrain, or angularly positioning the derrick digger structure for any reason whatever. The frame 54 being fixed to the pivot tube, it will be understood that the cylinder 58 as well as the winch 56 will swing with the frame 54, thereby maintaining proper relationship of the parts one with respect to the other.

Turning now to the showing in FIGS. 2 and 8 of the drawing, it will appear that, fixed to the lower surface of the rails 21 of the swinging frame 22, are four bearing shoes 94, two only of which are shown in FIG. 2 and one of which is shown in cross-section in FIG. 8. These bearing shoes can be composed of any suitable bearing material to ride over the upper surface of the support ring 14, as the frame 22 is swung through the arcs heretofore mentioned. Each of the shoes will be supported by two screws 95, as indicated in FIG. 2 of the drawing in the broken-away sectional portion and one of these screws 95 is shown in FIG. 8. These screws preferably bear upon a plate 96 fitted within the channel of the rails 21, as clearly noted in FIG. 8. It will appear that the bevelled head 97 of the screw is countersunk in the bearing shoes 94.

In the use of the combination derrick digger structure, it will be understood that the frames 63, 68 can be bodily advanced to extend the rails 42 and all of its associated parts rearwardly beyond the rear end of the truck through actuation of the hydraulic cylinder 46 and, in some instances, actuation of the hydraulic cylinder 58. In this latter operation, the supports 81 will swing on the pivot 82 and 85 will be adjusted to control engagement with the ground for support of the lower end of the digger frame 63 in the operation of digging a hole, in which a pole is to be set. At the same time, the derrick can be operated in the handling of a pole for setting in the hole formed by the digger operating in the frame 63, this last operation being performed primarily through operation of the cylinder 58 and rotation of the swinging frame 22 and, as and when required, operation of the cylinder 92 in providing any tilt that may be desired in forming any of these operations, the controls for the various cylinders being preferably located at one control station, convenient for use by the operator. A seat for the operator is commonly supported upon the swinging frame, but no attempt has been made to show this support or positioning of the operator. Here again, this is a common practice of providing a seat for the operator somewhere upon the truck body but, when the swinging frame is employed, it will be mounted upon this frame so that the operator moves with and is at all times properly positioned with respect to the derrick and digger structure.

In collapsing the combination derrick digger, the parts can assume their pre-adjusted position and collapse upon the body of the vehicle, as indicated in dotted lines in FIG. 1, or the derrick and digger frames can be adjusted one with respect to the other to further collapse the same, as well as collapsing 59 in the cylinder 58, as by the dotted line showing in FIG. 1.

Having fully described my invention, what I claim as new and desire to secure by Letters Patent is:

1. A combination derrick digger structure for vehicles, said structure comprising a derrick frame, a digger supporting frame, means pivotally supporting the digger frame on a chassis of the vehicle, said derrick frame having side columns mounted in side columns of the digger frame, means pivotally supported in connection with said first named means for support and guide of the lower ends of said side columns of the digger frame, said first named means including a hydraulic cylinder pivotally supported in connection with said digger frame, said first named means including a winch, a cable extending from said winch over a pulley on the derrick frame, said derrick and digger frames being collapsible upon the upper portion of the chassis of the vehicle, a support ring mounted in connection with the vehicle chassis, a swinging frame rotatable on said ring, said swinging frame supporting said first named means, and means supported on the swinging frame and operatively engaging said ring for movement of the swinging frame and the derrick and digger frames supported thereby through an arc of at least 200° with respect to the chassis of the vehicle.

2. A combination as defined in claim 1, wherein said first named means includes a pair of slide rails movable longitudinally of said swinging frame, and a hydraulic cylinder supported in the swinging frame for actuating said rails in moving the same into extended positions with respect to the swinging frame.

3. A combination as defined in claim 2, wherein means is employed on the swinging frame for guiding said rails in their sliding movement.

4. A combination as defined in claim 1, wherein said derrick frame and digger frame include tubular side members, and the side members of the derrick frame telescoping in the side members of the digger frame.

5. A combination as defined in claim 1, wherein said derrick frame includes a crosshead upper portion and an upward extension to said crosshead, said pulley being mounted in the upper end of said extension, the digger frame including a crosshead having a pulley coupling, an idler pulley in said coupling, and the pivot of said hydraulic cylinder being with said coupling.

6. A combination as defined in claim 1, wherein ground supports are adjustably supported with the lower ends of the columns of said digger supporting frame.

7. A combination as defined in claim 1, wherein said second named means includes a frame tiltably supported in connection with the first named means, and a hydraulic cylinder for actuating said tiltable frame in controlling tiltable positioning of the derrick and digger frames with respect to the swinging frame.

8. A combination as defined in claim 1, wherein the swinging frame includes circumferentially spaced bearing shoes fixed thereto and operatively engaging said ring.

9. A combination as defined in claim 2, wherein said slide rails include means forming bearing supports for a pivot tube, and said pivot tube having means for pivotally supporting the hydraulic cylinder actuating the digger frame thereon.

10. A combination as defined in claim 9, wherein a winch is supported on said pivot tube.

11. A combination as defined in claim 9, wherein a tilt frame is fixed to said pivot tube, said second named means being mounted on said tilt frame, and a hydraulic cylinder pivotally coupled with means on said slide rail and in operative engagement with said tilt frame.

12. A combination digger derrick structure for vehicles, said structure comprising a derrick frame, a digger supporting frame, means pivotally supporting the digger frame on the chassis of the vehicle, means tiltably supporting the digger frame on the vehicle chassis, said last named means including a hydraulic cylinder, said derrick frame having side parallel columns mounted in side columns of the digger frame and adjustable in the digger frame, means pivotally supported in connection with said first named means for support and guide of the lower ends of said side columns of the digger frame, a hydraulic cylinder pivotally supported in connection with said digger frame for actuating both of said frames, said first named means including a pair of slide rails movable on the chassis of the vehicle, a hydraulic cylinder having a pivotal coupling with said rails for actuating said rails, means for guiding said slide rails, a winch supported in connection with said slide rails, a cable extending from said winch over a pulley on the derrick frame, and said derrick and digger frames being collapsible upon the upper portion of the chassis of the vehicle.

References Cited in the file of this patent

UNITED STATES PATENTS

| | | |
|---|---|---|
| 2,200,075 | Caldwell | May 7, 1940 |
| 2,665,116 | Brink et al. | Jan. 5, 1954 |
| 2,829,741 | Selberg et al. | Apr. 8, 1958 |
| 2,925,922 | Frenzel | Feb. 23, 1960 |